C. E. MOORE.
BATTERY GAGE.
APPLICATION FILED FEB. 27, 1917.

1,260,934. Patented Mar. 26, 1918.

Inventor
Clifton E. Moore

By Herbert E. Smith
Attorney

UNITED STATES PATENT OFFICE.

CLIFTON E. MOORE, OF COLFAX, WASHINGTON.

BATTERY-GAGE.

1,260,934.

Specification of Letters Patent. Patented Mar. 26, 1918.

Application filed February 27, 1917. Serial No. 151,263.

*To all whom it may concern:*

Be it known that I, CLIFTON E. MOORE, a citizen of the United States, residing at Colfax, in the county of Whitman and State of Washington, have invented certain new and useful Improvements in Battery-Gages, of which the following is a specification.

My invention relates to improvements in gages for electric batteries and more particularly to that type of battery that is used in connection with auto starting and lighting systems which require maintaining a water level above the plates to secure efficiency and prevent damage to said batteries.

The object of my invention resides in providing an inexpensive thoroughly practical gage embodying certain novel features of construction which may be readily constructed for use in the average battery with very little labor and expense.

I have shown in the accompanying drawings a construction especially adapted for use in batteries and by this arrangement I am enabled to secure an accurate knowledge of the water level within the battery and when the level is low I am enabled to raise the water level to the desired point and prevent overflowing of the battery.

In the accompanying drawings.

Figure 1:
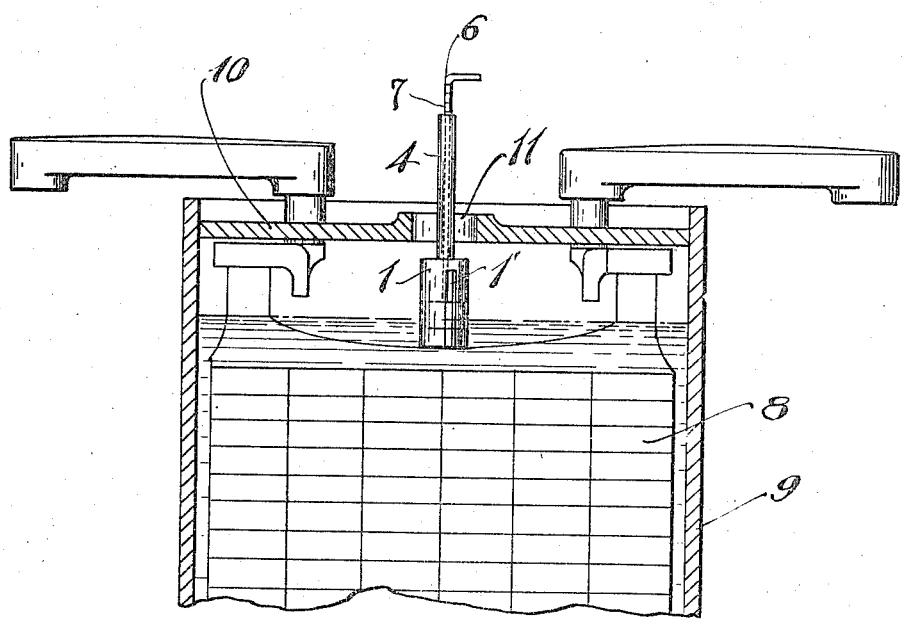
Figure 1 is a partial cross section through a battery of the type ordinarily used in electric starting and lighting systems for autos showing the method of applying my gage to read the water level therein.
Figure 2:
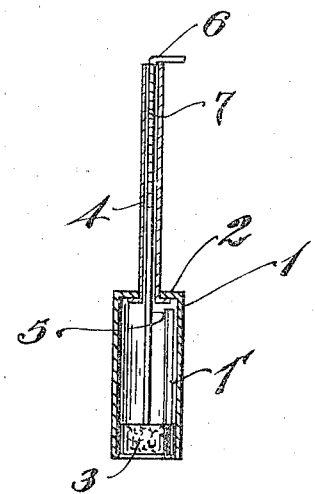
Fig. 2 is a cross section in elevation through my gage.

Referring more specifically to the drawings in which like reference characters are used to designate like parts in the several views, the numeral 1 indicates a tubular base consisting of a non-corrosive acid-proof material and it is especially desired that same be constructed of material that is comparatively heavy. In some embodiments I prefer to use lead or kindred metals in order to secure a base that is heavy and will substantially hold a gage in place while the battery is being filled. On the upper end of the tubular body 1 is a closure 2 provided to prevent water entering the battery from affecting a true reading upon the float means 3 contained within the casing 1. The casing 1 is further provided with a perpendicular slot 1' extending from the bottom to a point near the top of said base and is provided for the purpose of preventing compression of air between the venting end of the base to retard float and the upper end of the base to retard the action of the float. Centrally of the closure 2 I provide an opening and therein mount a tubular stem 4 extending upward so that when the base member 1 is resting upon the plates of the battery the tube will project therefrom a short distance. Within the stem 4 I mount a gage rod 5 extending downward and through the tubular base 1 to engage with the cork or float 3. I provide the stem 5 sufficiently long so that when the float 3 is at the bottom of the tubular base 1 the gage rod will extend slightly above the stem 4 and to prevent loss of the rod through the stem I bend the end 6 as illustrated in the drawing. Thus when I place my gage within a battery wherein the water level is lower than the top of the plates I am sure that the float is resting also upon the plates. As the battery is filled the float will rise and by markings 7 upon the gage rod I am enabled to gage the distance or depth of the water over the top of the plates 8 of the battery. I am also able where the light is insufficient, by determining the distance between the top of the stem 4 and the bent over portion of the gage rod 6, to know exactly how much water has been placed in the battery. The battery of the usual type consists of a casing 9, a cover plate 10, a bossed opening 11 for filling the battery and the plates 8 which are mounted therein and acted upon by an acid or other solution for providing current.

On account of the necessity of the presence of acids in batteries I prefer to construct my gage of an acid-proof material so that it will not become corroded or destroyed by the acid or fumes therefrom. It is also necessary to provide the base of a heavy material so that it will not be displaced to render the reading inaccurate while the battery is being filled, as it is necessary to pour the water over the gage while so doing.

While I have specifically described the elements best adapted to perform the function set forth it is obvious that various changes in the form, proportions and in the details of construction may be resorted to without departing from the spirit of the invention as hereinafter claimed and I want it understood that I distinctly reserve the right to make such changes without waiving the protection sought by this application for patent.

Having described my improvements, its operation and advantages, what I claim as new and desire to secure by Letters Patent of the United States, is:—

1. A portable gage comprising an open-bottomed slotted, tubular base having a closed top and a tubular stem, combined with a float movable in the base, a graduated plunger rod attached to the float and movable in the stem, said rod having a bent upper end to suspend the rod and float as described.

2. A portable gage comprising an open-bottomed tubular base, formed with an open-ended slot extending throughout its length, said base having a closed top, a central tubular stem projecting from said top, a graduated rod in said stem having an upper bent, suspending end, and a float at the lower end of the rod having movement in the base and with its lower end normally coincident with the edge of the open end of the base.

In testimony whereof I affix my signature.

CLIFTON E. MOORE.